INVENTOR.
EDWARD H. REPLOGLE
BY
ATTORNEYS

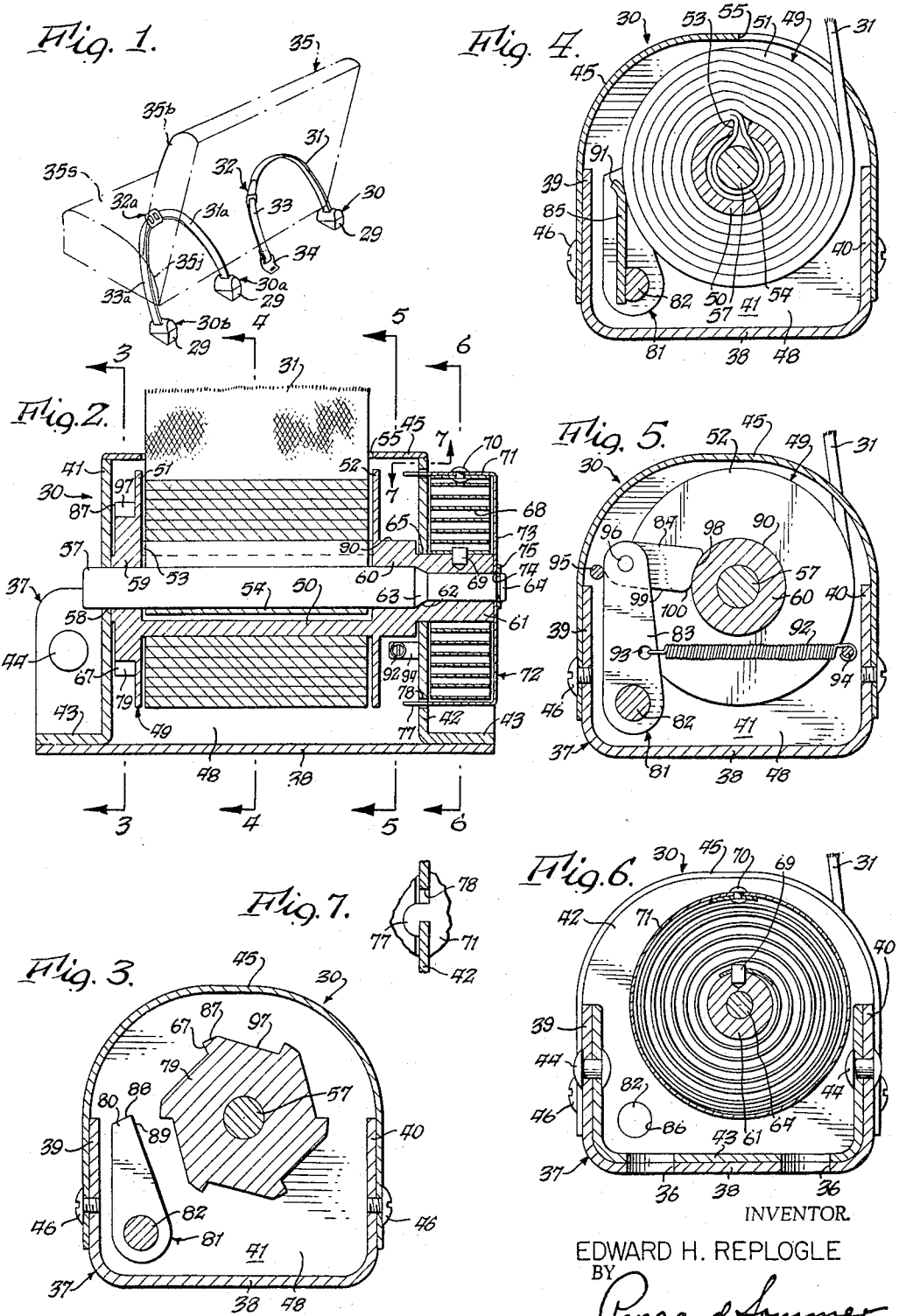

Nov. 29, 1966  E. H. REPLOGLE  3,288,254
ONE WAY RESTRAINT APPARATUS
Original Filed Sept. 12, 1963  5 Sheets-Sheet 3

INVENTOR.
EDWARD H. REPLOGLE
BY
Popp and Sommer
ATTO...'S

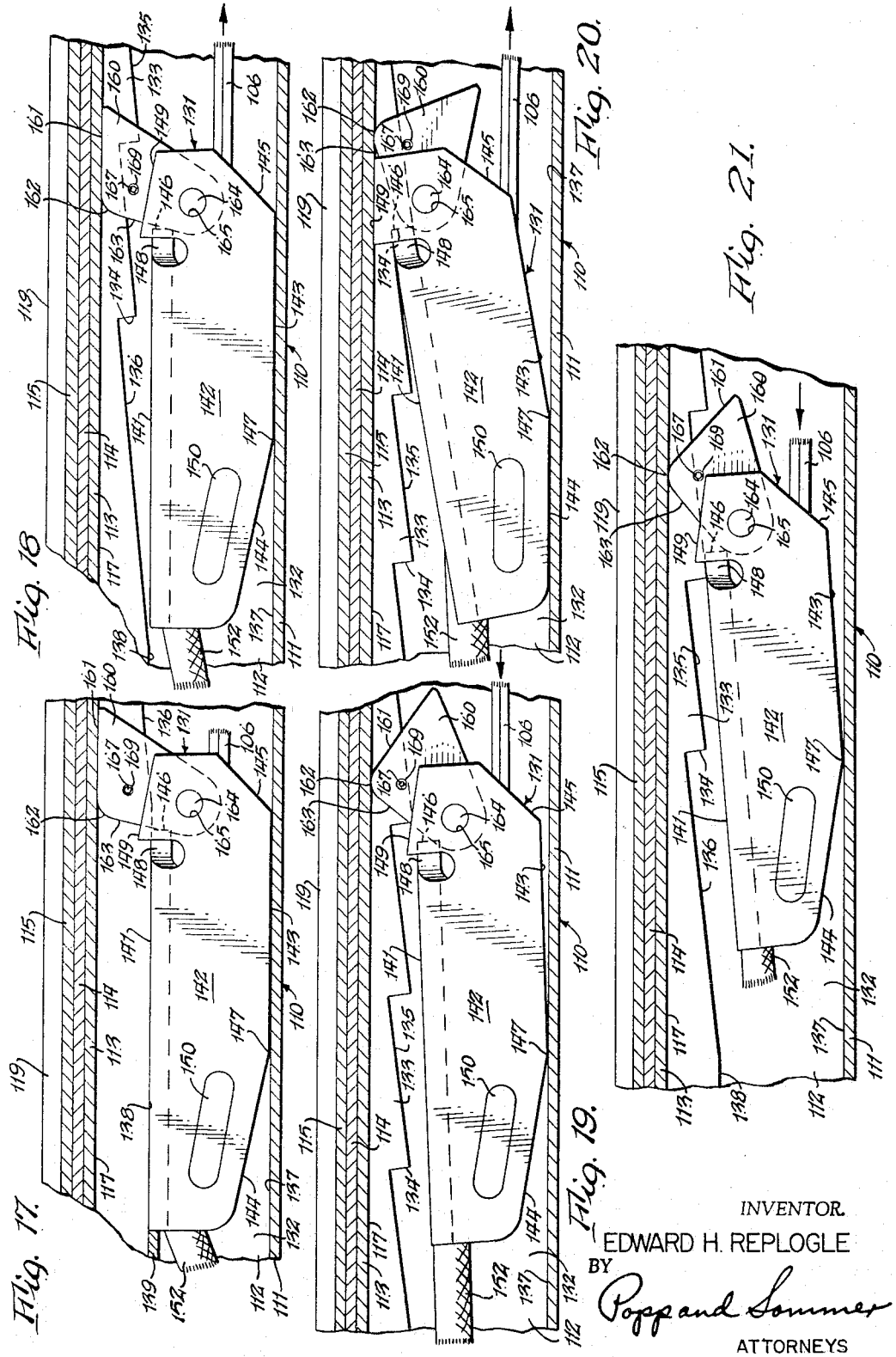

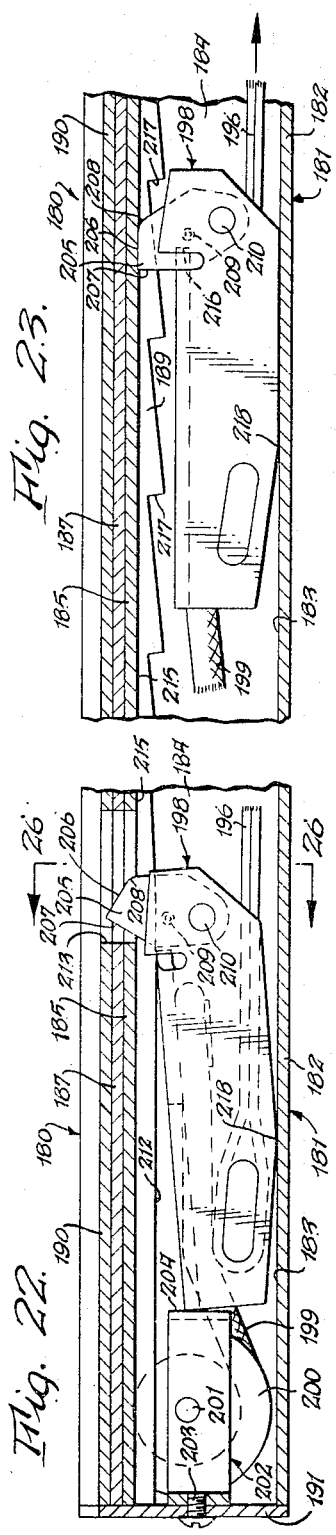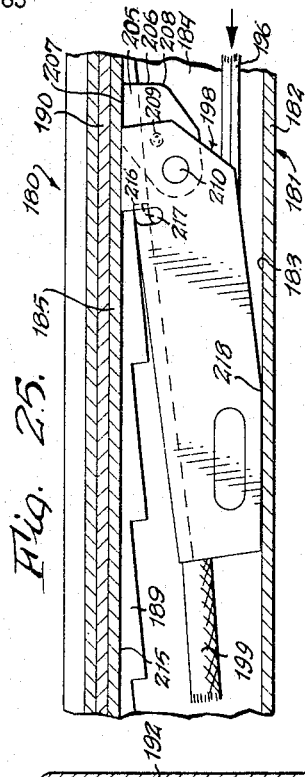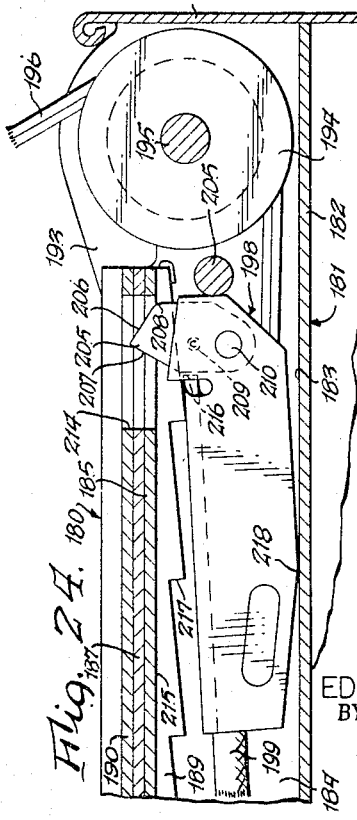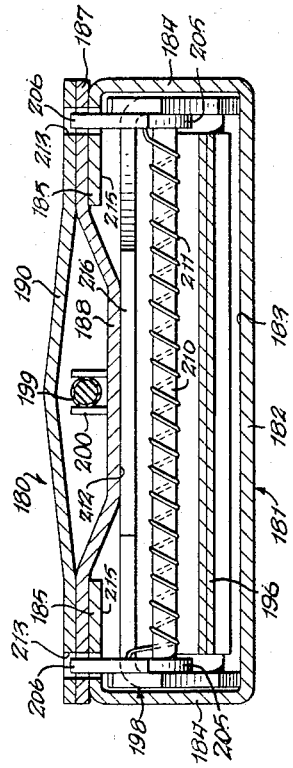

United States Patent Office 3,288,254
Patented Nov. 29, 1966

3,288,254
ONE WAY RESTRAINT APPARATUS
Edward H. Replogle, Buffalo, N.Y., assignor to American Safety Equipment Corporation, New York, N.Y., a corporation of New York
Original application Sept. 12, 1963, Ser. No. 308,591, now Patent No. 3,174,704, dated Mar. 23, 1965. Divided and this application Feb. 4, 1965, Ser. No. 464,253
9 Claims. (Cl. 188—82.3)

This application is a division of my copending application Serial No. 308,591, now Patent No. 3,174,704 issued March 23, 1965.

This invention relates to improvements in restraint apparatus, and more particularly to such apparatus of the type associated with a passenger supporting seat in a vehicle such as an automobile or airplane and including a restraining element such as a belt which engages the body of the passenger and is effective to hold him to the seat during rapid deceleration.

An important object of the present invention is to provide such restraint apparatus in which the restraining element when worn by a passenger is in a normally locked-up condition whereby the restraining element is prevented from being payed out or protracted further.

Another object is to provide such restraint apparatus in which the restraining element when not in use is retained in a retracted condition from which it can be protracted to any extent desired for use.

Another object is to provide such restraint apparatus in which the restraining element is constantly biased toward full retraction so that when manually protracted for use and manually released the restraining element will automatically adjust to fit the particular wearer.

Still another object is to provide such restraint apparatus in which the restraining element when to be used is allowed to be over-protracted manually a first time from a fully retracted condition so as to enable the element to be fastened about the wearer's body, following which when unhanded there is some automatic retraction to take up slacks in fitting the wearer's body which renders the restraining element incapable of being protracted to any extent a second time.

Another aim of the invention is to provide such restraint apparatus in which the restraining element can be released from its normally locked-up condition so as to free the wearer, by unfastening the restraining element and allowing it to retract substantially fully, following which it is capable of being protracted manually again to any desired extent.

Another object is to provide such restraint apparatus which is relatively simple in construction, inexpensive to manufacture and not likely to get out of order or require repairs.

Other objects and advantages of the present invention will appear from the ensuing detailed description of several embodiments thereof illustrated in the accompanying drawings wherein:

FIG. 1 is a perspective view on a diminutive scale of restraint apparatus constructed in accordance with the principles of the present invention and showing a reel structure constituting one embodiment thereof associated with a passenger carrying seat represented in phantom, several of such reel structures being illustrated.

FIG. 2 is the vertical central longitudinal sectional view, on an enlarged scale, of one of the reel structures shown in FIG. 1.

FIG. 3 is a vertical transverse sectional view thereof taken on line 3—3 of FIG. 2.

FIG. 4 is another vertical transverse sectional view thereof taken on line 4—4 of FIG. 2.

FIG. 5 is still another vertical transverse sectional view thereof taken on line 5—5 of FIG. 2.

FIG. 6 is yet another vertical transverse sectional view thereof taken on line 6—6 of FIG. 2.

FIG. 7 is a fragmentary horizontal sectional view thereof taken on line 7—7 of FIG. 2.

Figure 8:
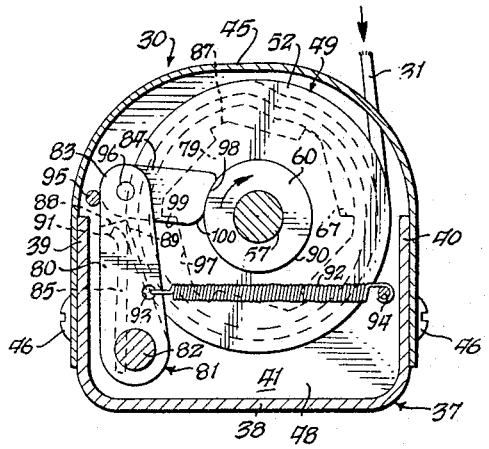
Figure 9:
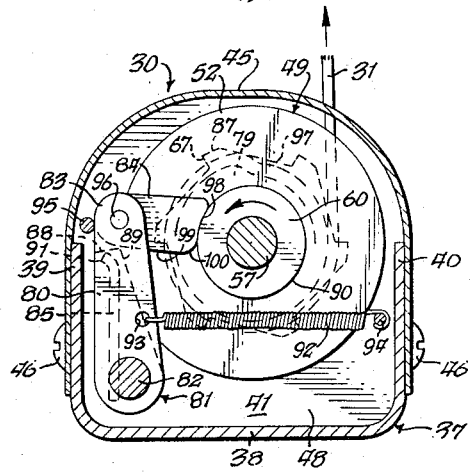
Figure 10:
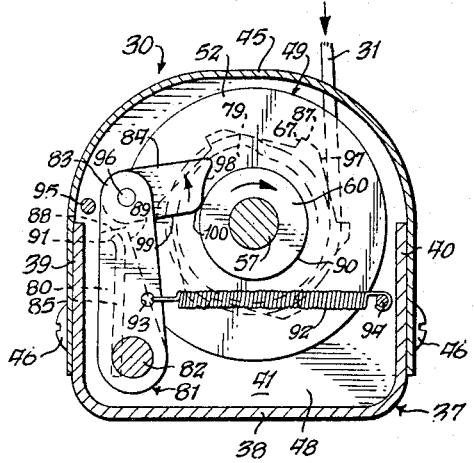
Figure 11:
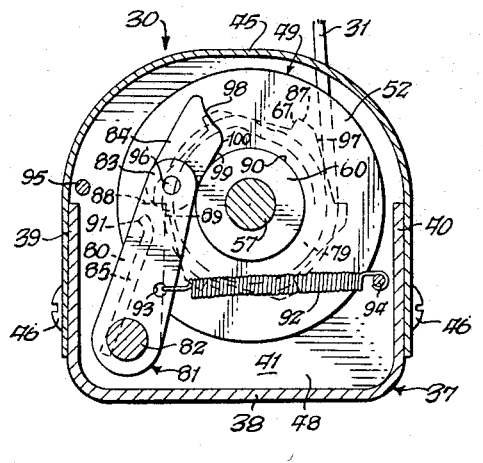

FIGS. 8-11 are transverse sectional views severally similar generally to FIG. 5 but illustrating the various parts in different positions during different phases of operation of the apparatus whereby these views depict a sequence of operation; FIG. 8 illustrating the condition of the parts as the restraining element approaches full retraction, FIG. 9 illustrating the condition of the parts during partial first protraction of the restraining element, FIG. 10 illustrating the condition of the parts during subsequent partial retraction of the restraining element, FIG. 11 illustrating the condition of the parts during subsequent attempted protraction of the restraining element.

FIG. 12 is a perspective view on a diminutive scale of restraint apparatus constructed in accordance with the principles of the present invention and showing one form of linear structure constituting a second embodiment thereof associated with a passenger carrying seat represented in phantom, several of such linear structures being illustrated.

FIG. 13 is a vertical longitudinal sectional view, on an enlarged scale, of one of the linear structures shown in FIG. 12 and illustrating certain internal parts in elevation with portions broken away to reveal hidden structure, the pawl member being shown in a position corresponding to full retraction of the restraining element.

FIG. 14 is an enlarged perspective view of the slidable pawl member and associated deactivator means shown in FIG. 13.

FIG. 15 is a further enlarged vertical transverse sectional view of the linear structure shown in FIG. 13 and taken on line 15—15 thereof.

FIG. 16 is a fragmentary vertical central longitudinal sectional view thereof taken on line 16—16 of FIG. 15.

FIG. 17 is a fragmentary vertical longitudinal sectional view thereof taken on line 17—17 of FIG. 15 and depicting the pawl member and associated deactivator means in a condition corresponding to full retraction of the restraining element.

FIGS. 18-21 are views similar to FIG. 17 but showing the slidable pawl member and associated deactivator means in different longitudinal positions along the elongated housing and in different positions relative thereto whereby these views depict a sequence of operation; FIG. 18 illustrating the condition of the parts when the restraining element is being first protracted, FIG. 19 illustrating the condition of the parts during subsequent partial retraction of the restraining element, FIG. 20 illustrating the condition of the parts during subsequent attempted protraction of the restraining element, and FIG. 21 illustrating the condition of the parts during subsequent partial retraction of the restraining element.

FIG. 22 is an enlarged fragmentary sectional view similar to the left-hand portion of FIG. 13 but illustrating a modified construction of linear type restraining apparatus and therefore constituting a third embodiment of the present invention, the pawl member being shown in a position corresponding to full retraction of the restraining element.

FIG. 23 is a view similar to FIG. 22 but showing the slidable pawl member and associated deactivator means in an intermediate position along the elongated housing and illustrating their condition when the restraining element is being first and partially protracted.

FIG. 24 is a view similar to FIGS. 22 and 23 but illustraining the slidable pawl member and associated deactivator means in an extremely rightward position with respect to the elongated housing and depicting their condition when the restraining element has been fully protracted.

FIG. 25 is a view similar to FIG. 23 but illustrating the position of the slidable pawl member and associated deactivator means with respect to each other and also with respect to an intermediate portion of the elongated housing during subsequent partial reaction of the restraining element.

FIG. 26 is a vertical transverse sectional view of the restraint apparatus shown in FIG. 22 and taken on line 26—26 thereof.

FIGS. 1–11

The inventive restraint apparatus is illustrated in FIGS. 1–11 as embodied in a reel type structure. The reel structure is represented generally by the numeral 30 in FIG. 1 and three such reed structures are illustrated, the additional two being designated 30a and 30b. A restraining element 31 shown as a length of strap is operatively associated with the reel structure 30. The outer or free end of this strap 31 carries one element of a disconnectable and separable two-element buckle indicated generally at 32, the other element of which is suitably connected to the end of a second strap 33. The opposite end of this strap 33 is suitably fastened to an attaching bracket 34.

The reel structure 30 and bracket 34 are suitably secured to the frame (not shown) of a vehicle behind a seat structure indicated at 35 and adjacent one end thereof. This seat structure 35 is shown as including a seat portion 35s and a back portion 35b forming a joint 35j therebetween. The bracket 34 is arranged toward the longitudinal center of the seat structure, and the reel structure 30 adjacent the outer end thereof. The fixed length of strap 33 projects through the joint 35j whereas the other strap 31 traverses the laterally outer end of the seat portion 35s.

The buckle 32 may be of any suitable construction. When its elements are joined together so as to connect the straps 31 and 33 around the body of a wearer sitting on the seat structure 35 adjacent the corresponding end thereof, the right end as viewed in FIG. 1, a safety belt is provided so that the strap 31 is prevented from further protraction following adjustment to suit the body of the wearer, as more fully explained later herein. Thus when in use the safety belt is in a normally locked-up condition.

The reel structure 30a is shown arranged toward the longitudinal center of the seat structure 35, and the reel structure 30b adjacent the outer end thereof, so that these reel structures are arranged laterally on opposite sides of a person who would occupy the left end portion of the seat structure 35, as viewed in FIG. 1. A restraining element 31a shown as a length of strap is operatively associated with the reel structure 30a. Another restraining element 33a shown as a length of strap is operatively associated with the reel structure 30b. A disconnectable two-element buckle indicated generally at 32a has its elements severally connected to the outer or free ends of the straps 31a and 33a. The reel structures 30a and 30b are suitably secured to the vehicle frame (not shown) behind the seat structure 35. The strap 31a projects upwardly and forwardly through the joint 35j, whereas the strap 33a traverses the corresponding laterally outer end of the seat portion 35s.

The buckle 32a may be of any suitable construction. When its elements are joined together so as to connect the straps 31a and 33a around the body of the wearer occupying the corresponding seat end portion, a safety belt is provided so that the straps 31a and 33a are prevented from further individual protraction following adjustment to fit the body of the wearer, as more fully explained later herein. Thus when in use the safety belt provided by the connected straps 31 and 33a is in a normally locked-up condition.

Each of the various straps 31, 31a and 33a is a protractile and retractile restraining element the effective length of which depends upon the extent to which the strap is protracted from the housing of the corresponding reel structures 30, 30a or 30b. Since these reel structures are identical in construction, only a detailed description of the reel structure 30 will be given and it is intended to be equally applicable to and descriptive of the other reel structures 30a and 30b.

The reel structure 30 has a frame shown as including a channel member 37 having a base portion 38 and upstanding integral flange or side wall portions 39 and 40. The frame also includes a first upstanding end wall 41 and a second upstanding end wall 42 spaced from the end wall 41. These end walls 41 and 42 are arranged slightly inwardly of and adjacent the opposite ends of the channel member 37 between the side walls 39 and 40 thereof. Each of the end walls 41 and 42 includes an outwardly extending integral flange 43 which extends not only over the base portion 38 but also extends along the side wall portions 39 and 40, as shown in FIG. 6. These flanges 43 are shown as fastened to the side wall portions 30 and 40 by rivets 44, two such rivets being employed to secure each flange 43, as best shown in FIG. 6.

A pair of holes 36 is provided through the channel base 38 and superposed flange 43 at each end of the structure so that fastening devices such as bolts (not shown) may be inserted through these holes for fastening the reel structure 30 to the vehicle frame (not shown). In FIG. 1, an adapter bracket 29 is shown as arranged under each of the reel structures 30, 30a and 30b for supporting the same in a forwardly and downwardly inclined position so that tangential pay-out of the straps 31, 31a and 33a directs these straps toward the joint 35j. Any other suitable type of mounting may be employed.

The approximate upper half portion of each of the end walls 41 and 42 extends above the top edges of the channel flanges 39 and 40 and has a generally semi-circular outline when viewed from the end of the reel structure, as shown in FIGS. 3–6 and 8–11. A cover plate 45 is shown as engaging these generally semi-circular upper edges and as overlapping the channel flange portions 39 and 40, being secured thereto by one or more screws 46 on each side.

Thus the end walls 41, 42 and the cover 45 provide a compartment 48 in which a reel indicated generally at 49 is housed. The reel 49 is shown as comprising a spool having a sleeve 50 and axially spaced integral end heads 51 and 52. The sleeve 50 has a longitudinal slot 53 extending for its full length between its end heads 51 and 52 through which the looped end portion 54 of the strap 31 is partially inserted. This strap 31 may be made of any suitable material so as to be flexible whereby it may be wound around the reel sleeve 50 as shown in FIG. 4 and also strong enough to withstand the loading to which it may be subjected in use. The loop 54 may be formed in any suitable manner. The strap 31 extends through an opening 55 provided in the cover 45 adjacent the top and one side of the longitudinal center thereof, this opening extending arcuately in the direction of curvature of the cover for some extent to permit the strap as it extends through the opening to assume a wide variety of angular dispositions. The opening 55 also extends longitudinally of the reel so as to be slightly longer than the width of the strap, as shown in FIG. 2.

The reel 49 is supported for rotation about a horizontal axis, as viewed in FIG. 2. While this may be accomplished in any suitable manner, the means for effecting this are shown as comprising a stationary cylindrical axle 57 one end of which extends through a circular hole 58 provided in the end wall 41. Immediately inwardly of the end wall 41, the spool end head 51 is shown as extended radially inwardly of the inside diameter of the sleeve 50 and extended axially outwardly to provide an integral hub portion 59 which engagingly surrounds the axle 57 and is journalled thereon. The other spool end head 52 is shown as having an integral radially inwardly extending inner hub portion 60 engagingly surrounding the axle 57 and an outer integral hub portion 61 of smaller inside diameter. The bores of the hub portion 60 and 61 are connected by a frusto-conical section 62 adapted to engage a frusto-conical transition section 63 formed on the axle 57. A cylindrical reduced diameter axle end portion 64 extends coaxially outwardly from the transition section 63 and is peripherally engaged by the inner cylindrical surface of the outer hub portion 61. The outer hub portion 61 extends outwardly through a hole 65 provided in the end wall 42 and has a cylindrical periphery which engages the wall surface of this hole 65 whereby the corresponding end portion of the reel is journalled on this end wall. Thus the axle 57 is intended to be stationary and the reel 49 rotates thereon, engaging the same by the hub portions 59–61; and this reel rotates relative to the frame, being journalled in the end wall bearing holes 58 and 65.

The diametrically and axially largest part of the axle 57 extends through the opening provided in strap loop 54. Any other suitable mode of fastening the inner end of the strap 31 to the reel 49 may be employed.

Means are provided for constantly urging the strap 31 to a fully retracted or predetermined wound-up condition on the reel 49. While such means may be variously constructed, the same is shown as comprising a spiral leaf spring 68 arranged within a cup-shaped casing indicated generally at 72. The inner convolution of this spring surrounds the outer hub portion 61 and the inner extremity of this spring is shown as connected to this hub portion by a radial pin 69 which extends through a hole provided in the spring end and is partially received in a recess provided in the hub portion 61.

The outer extremity of the spiral spring 68 is shown as riveted at 70 to the circular side wall 71 of the casing 72 which also has an end wall 73 provided centrally with a hole 74 through which the free end portion of the reduced axle portion 64 extends. The latter is provided with an annular groove immediately outside the end wall 73 in which groove a split retaining ring 75 of conventional construction is partially arranged. This split ring 75 partially overlaps the casing end wall 73. In this manner, the axle 57 is held against leftward axial displacement with respect to the reel 49 and its frame, as viewed in FIG. 2, and the engaging shoulders 62 and 63 prevent righthand movement of the axle relative to the reel. The outer end face of the hub 61 of the reel closely opposes the inner surface of the casing end wall 73 to prevent rightward movement of the reel relative to the frame.

The rim of the cup-shaped casing 72 engages the axially facing outer surface of the end wall 42 and this casing is suitably fastened to this end wall. For this purpose, the casing is shown as provided with a pair of diametrically opposed hook-shaped lugs 77 which extend axially outwardly from the casing rim, being preferably formed integrally therewith, and these lugs are severally adapted to penetrate slots 78 provided in the end wall 42. The lugs 77 are adapted to hook over the marginal portion of wall 42 at one edge of the corresponding slot 78, as best shown in FIG. 7. This is effected by first inserting the lugs through the slots and rotating the casing 72 relative to the end wall 42 in a counterclockwise direction as viewed in FIG. 6. Further, it will be seen that the circular side wall 71 of the casing 72 is constantly urged to rotate in a counterclockwise direction as viewed in FIG. 6 so as to retain the offset ends of the lugs 77 hooked over the end wall 42, as shown in FIG. 7.

With further reference to FIG. 6, it will be seen that when protracting or pulling out strap 31, the reel 49 including its outer hub portion 61 is rotated in a counterclockwise direction so as further to wind up and load the spiral leaf spring 68. Even when the strap 31 is in a fully retracted condition the spring 68 is preferably preloaded in a direction to urge further retraction.

One-way stop means are provided to be inoperative to prevent protraction of the strap 31 from a predetermined retracted condition in which it is partially stowed within the reel housing but rendered operative to prevent protraction of the strap after partial retraction thereof. While such means may be variously constructed, the same are shown as comprising engageable and disengageable lock members 79 and 80. The lock member 79 is shown in the form of a toothed ratchet wheel preferably formed integrally with the spool end head 51 and including a plurality of circumferentially spaced teeth 87. Each tooth has a radial abutment surface 67 and a part-arcuate and part-chordal cam surface 97. As shown, the ratchet wheel 79 is arranged laterally outwardly of the end head 51 between the same and the end wall 41. The ratchet teeth 87 are concentrically formed with respect to the longitudinal axis of the axle 57.

The other lock member 80 is shown as being a pawl, one element of a movable assembly indicated generally at 81. Besides the pawl 80, the assembly 81 is shown as comprising a shaft 82 arranged generally parallel and eccentric to the axle 57, a deactivator arm 83, a deactivator finger 84, and a sensor arm 85. The shaft 82 extends between the end walls 41 and 42 and is suitably journalled in bearing holes provided therein, one of which holes is shown at 86 in FIG. 6.

The pawl 80 is arranged opposite the ratchet wheel 79 and is shown as having an abutment end face 88 on its outer or free end and a cam face 89 on its side opposite the ratchet wheel. When the pawl is moved so that its free end is swung toward the ratchet wheel 79, the abutment faces 67 and 88 are adapted to engage each other as shown by dotted lines in FIG. 11, if the wheel 79 is urged to rotate in a counterclockwise direction as viewed in FIGS. 3 and 11. On the other hand, if this wheel 79 is rotated in a clockwise direction, the cam surfaces 97 and 89 will engage and ratchet one on the other to allow such movement of this wheel.

The deactivator arm 83 is disposed opposite the inner hub portion 60 of the reel 49 which has a cylindrical peripheral surface 90 which acts as a friction drum for a purpose explained later herein.

The sensor arm 85 is arranged on the shaft 82 intermediate the pawl 80 and the deactivator arm 83. This sensor arm 85 is shown as having a slightly curved outer end portion 91 adapted to bear against and slidably engage the periphery of the outermost convolution of the strap 31 wound around the sleeve 50 of the reel 49.

The pawl 80, deactivator arm 83 and sensor arm 85 are all fast to the shaft 82 so as to move therewith as a unitary assembly. This assembly 81 is urged to pivot about the longitudinal axis of the shaft 82 so as to move the upper or free ends of the various parts 80, 83 and 85 toward the reel 49. While this may be achieved in any suitable manner, the means for effecting this are shown as including a preloaded helical tension spring 92 one end of which is hooked into a hole 93 provided in the deactivator arm 83 intermediate its ends, and the outer end of which is hooked over an anchor pin 94 suitably mounted on the end wall 42 and extending axially inwardly therefrom.

The assembly 81 is shown as limited in the extent to which it can pivot or swing in an opposite direction about the longitudinal axis of shaft 82. As shown in FIG. 5, a stop pin 95, which may be suitably mounted on the end wall 42 and shown as extending axially inwardly therefrom, is adapted to be engaged by the deactivator arm 83 adjacent its free end on the side thereof remote from the reel 49.

The deactivator finger 84 has one end suitably pivotally connected to the outer end of the deactivator arm 83. For this purpose, the arms 83 and 84 are shown as overlapping each other and pivotally connected by a pivot pin 96 the axis of which is generally parallel to that of the shaft 82. The other end of the deactivator finger 84 is provided with a concave end face 98 which is joined to one straight side edge 99 of the finger by a rounded corner portion indicated at 100.

In explaining the operation of the form of the invention shown in FIGS. 1–11, it is first assumed that the strap 31 is approaching its fully retracted condition as depicted in FIG. 8. As there shown, the reel 49 is rotating in a clockwise direction, so that the radial thickness of the portion of the strap wound around the reel 49 is sufficient to engage the sensor arm 85. Such engagement displaces the movable assembly 81 in a counterclockwise direction about the axis of shaft 82 to the maximum extent permitted by the stop pin 95 being engaged by the deactivator arm 83. As the strap 31 approaches its fully retracted condition, even though the friction drum 90 is being rotated in a clockwise direction so as to have a frictional contact with the finger face 98, the weight of this finger overcomes this frictional effect so that this face 98 slides on the drum surface 90 to maintain the finger in the position shown in FIG. 8. In such position the finger 84 is in its maximum pivotal position in a clockwise direction relative to the deactivator arm 83 about the axis of pivot pin 96. The end face 98 of the deactivator finger 84 may be considered to engage the drum surface 90 at a place laterally of and above an imaginary line connecting the longitudinal axis of axle 57 and that of pivot pin 96.

Assume now that the strap 31 is starting to be pulled from its aforesaid fully retracted position. What then happens is depicted in FIG. 9. With protraction of the strap 31, the reel 49 rotates in a counterclockwise direction. The frictional engagement between its drum surface 90 and the finger end face 98 tends to pivot the finger 84 relative to the deactivator arm 83 in a clockwise direction about the axis of pivot pin 96 but such further pivotal movement cannot occur because the deactivator arm 83 is already engaging the stop pin 95. The finger 84 thus remains in the position shown in FIG. 9.

It will be noted that during continued protraction of the strap 31 the effective diameter of the portion of the strap wound around the reel 49 decreases so as to terminate contact between the outermost strap convolution and the sensor arm 85. Notwithstanding such separation, the finger 84 acts as a strut effective to hold the pawl 80 out of engagement with the ratchet wheel 79. Thus the arm 83 and finger 84 serve as a deactivator means operative to maintain the assembly 81 in a position in which the pawl 80 is held out of engagement with the ratchet wheel 79.

At this juncture, it is to be observed that the first protraction just described is that which attends the seat occupant first pulling the strap 31 outwardly from the reel structure 30 to fasten the strap about his body. This initial protraction of the strap is naturally excessive so as to enable the elements of the buckle 32 to be connected together. Following connection of the buckle elements, the strap 31 is manually released whereupon the action of the retraction spring 68 rotates the reel in a clockwise direction as viewed in FIGS. 3–6 and 8–11 until the belt provided by the joined strap portions 31 and 33 adjusts itself to the girth of the wearer's body. This partial retraction of the strap 31 will produce the following operation.

It is during this partial retraction that the friction drum 90 rotates in a clockwise direction, as depicted specifically in FIG. 10. During this small amount of retraction the frictional engagement between the drum surface 90 and deactivator finger face 98 is such as to pivot this finger in a counterclockwise direction relative to the deactivator arm 83 about the axis of the pivot pin 96. During such counterclockwise pivotal movement and with the added urging of the spring 92, the finger 84 first rolls on the drum 90 about the curved corner edge portion 100 and then slides on the straight side edge portion 99, this latter condition being depicted in FIG. 11. Thus the effectiveness of the deactivator finger 84 as a strut to hold the pawl 80 out of engagement with the ratchet wheel 79, is destroyed. Rather, the aforementioned counterclockwise movement of the finger 84 to its inoperative position illustrated in FIG. 11 allows the pawl 80 to swing toward and into engagement with the ratchet wheel 79. Such engagement between the members 79 and 80 prevents subsequent protraction of the strap 31. This is caused by the faces 67 and 88 on the wheel 79 and pawl 80, respectively, abutting each other. This is the normally locked-up condition of the strap 31 when worn as a belt by the passenger occupying the right hand portion of the seat structure 35 shown in FIG. 1. This normally locked-up condition gives the wearer a sense of security since he is positively restrained even from voluntarily moving forwardly so as to attempt to protract the belt strap 31 still further.

The wearer can readily free himself from the restraining effect of the strap 31. This is accomplished by manipulating and separating the two-element buckle 32, following which the strap 31 is retracted automatically by the spring 68 to a fully retracted condition in which the free end of the strap 31 is disposed closely adjacent the front side of the seat joint 35j, so as to be readily accessible for reuse.

During each full retraction, as the strap 31 is wound around the reel 49 the effective diameter increases so as to reestablish contact between the outermost strap convolution and the sensor arm 85. As this occurs and is maintained the sensor arm 85 swings the movable assembly 81 in a counterclockwise direction about the longitudinal axis of shaft 82 thereby swinging the pawl 80 out of engagement with the ratchet wheel 79. At the same time, the deactivator finger 84 is urged by its weight to rotate in a clockwise direction relative to the deactivator arm 83 about the axis of pivot pin 96 until it will ultimately resume its position depicted in FIG. 8.

It will thus be noted that the arm 83 and finger 84 act as means to deactivate the ratchet and pawl mechanism 79, 80 during the first protraction of the strap 31 immediately following full retraction thereof but such deactivator means are rendered inoperative upon partial retraction of the strap 31. Such rendering inoperative of the deactivator means allows the ratchet and pawl mechanism to become operative to prevent subsequent protraction of the strap 31, unless such strap has first been substantially fully retracted.

It will further be noted that as the strap 31 approaches its fully retracted condition, the sensor arm 85 acts as a means to reactivate the deactivator means comprising the arm 83 and finger 84.

FIGS. 12–21

The inventive restraint apparatus as illustrated in FIGS. 12–21 is embodied in one form of a linear type structure. The structure is represented generally by the numeral 105 and four such linear structures are illustrated, the additional three being designated 105a, 105b and 105c. A restraining element 106 shown as a length of strap is operatively associated with the linear structure 105. The outer or free end of this strap 106 carries one element 107 of a disconnectable and separable two-element buckle, the other element 108 of which is suitably connected to the outer or free end of a second strap 106a which is operatively associated with the linear structure 105a.

In similar manner, the linear structure 105b has a strap 106b provided at its outer or free end with its buckle element 107a. The linear structure 105c has operatively associated therewith a strap 106c to the outer or free end of which is connected the other buckle element 108a.

The linear structures 105 and 105a are shown as arranged generally horizontally under the seat portion 109s of a seat structure indicated generally at 109 which also includes a back portion 109b. The portions 109s and 109b form the usual joint 109j therebetween. The linear structures 105 and 105a are arranged to serve a person sitting between them at the remote end of the seat portion 109a as viewed in FIG. 12, the structure 105a being disposed toward the longitudinal center of the seat portion 109s and the structure 105 being adjacent the laterally outer end thereof. The straps 106 and 106a are shown as extending upwardly and forwardly through the joint 109j.

In order to illustrate the flexibility of mounting the linear structures, those designated 105b and 105c are shown as being disposed generally upright along the rear side of the back portion 109b of the seat structure 109. If desired, these linear structures 105b and 105c may even be arranged within the back portion 109b. In either event, the respective straps 106b and 106c are shown as extending forwardly and upwardly through the joint 109j and are arranged to serve a person sitting on the near end portion of the seat 109a, as viewed in FIG. 12.

The buckles represented by the corresponding pairs of elements 107, 108 and 107a, 108a may be of any suitable construction. When the elements 107 and 108 are joined together so as to connect the straps 106 and 106a around the body of the wearer sitting on the seat portion 109a between the linear structures 105 and 105a, a safety belt is provided so that these straps are prevented from further protraction following their respective adjustments to suit the body of the wearer, as more fully explained later herein. In similar fashion, when the buckle elements 107a and 108a are joined together in front of the body of a person sitting on the seat portion 109s between the linear structures 105b and 105c, a second safety belt is provided so that the straps 106b and 106c are prevented severally from further protraction following individual adjustment to suit the body of the wearer, as will also be apparent from the fuller explanation later herein. Thus when in use the safety belts so provided are each in a normally locked-up condition.

Each of the various straps 106, 106a, 106b and 106c is a protractile or retractile restraining element the effective length of which depends upon the extent to which the strap is protracted from the elongated housing of the corresponding linear structure 105, 105a, 105b and 105c. Since these linear structures are identical in construction, only a detailed description of the linear structure 105 will be given and it is intended to be equally applicable to and descriptive of the other linear structures 105a, 195b and 105c.

The linear structure 105 has a frame shown as including a channel member 110 having a base portion 111 and transversely spaced upstanding integral flange or side wall portions 112. The upper end of each of these side walls 112 is shown as having an inwardly turned integral horizontal flange 113, these flanges severally having lower surfaces 117 which are coplanar. The open upper end of the channel member 110 is shown as closed by an inner cover 114 and an outer cover 115. These covers have superposed horizontal marginal portions along their longitudinal edges which overlay the inturned flanges 113 and this stacked assembly is held together by a series of longitudinally spaced screws 116. The central portions of the inner cover 114 is shown as longitudinally depressed as indicated at 118. The central longitudinal portion of the outer cover 115 is transversely arched upwardly as indicated at 119. This provides a longitudinally extending upper space 120 between the covers 114 and 115.

One end of the channel member 110 is closed by an end wall 121. The other end is closed by a second end wall 122 which extends downwardly and is joined to laterally spaced gusset plates 123 to provide an attaching bracket indicated generally at 124. The end wall 122 and gusset plates 123 are preferably secured to the channel member 110 by welding. Between the gusset plates 123 is shown a bolt 125 for attaching the linear structure 105 to the vehicle frame represented by the element 126. Any other suitable mode of attaching the linear structure 105 to the vehicle frame may be employed.

Adjacent the end wall 122, the covers 114 and 115 are provided with an opening indicated at 128 in which a spool or guide roller 129 is arranged for rotation about the axis of a transverse axle 130 the ends of which are suitably mounted on the side wall portions 112 of the channel member 110. Passing through the opening 128 and around the spool 129 is the strap 106. As previously explained, the outer or free end of this strap 106 carries the buckle element 107. The inner end of this strap 106 is suitably connected to a pawl member indicated generally at 131. This pawl member 131 is slidable longitudinally of the elongated housing 132 provided by the channel member 110 with its inner cover 114.

The pawl member 131 is a component of irreversible one-way stop means inoperative to prevent initial protraction of the strap 106 from a fully retracted condition in which this strap is partially stowed within the housing 132, but rendered operative to be further protracted after partial retraction of the strap. Other components of such one-way stop means include a plurality of ratchet teeth severally indicated at 113 arranged on the central depressed portion 118 of the inner cover 114. These ratchet teeth 133 are shown as lugs struck out from the sheet metal of which the cover 114 is fabricated and severally incline downwardly and to the left as viewed in FIG. 13, or toward the starting position of the pawl member 131 when the trap 106 is in a fully retracted condition, as illustrated in such figure. Each of the lugs 113 has an abutment end face 134 and a downwardly facing inclined cam surface 135.

The lugs or teeth 133 are arranged in a row one after the other beginning adjacent the opening 128 at the right end of the linear structure as shown in FIG. 13, and continue to a point adjacent the left end of this structure. To the left of the last end tooth 133 the central portion of the cover 114 inclines downwardly and to the left with an elongated ramp surface 136 which intersects with a depressed horizontal surface 138. This surface 138 is vertically spaced from and generally parallel to the floor or upper surface 137 of the channel base portion 111. A suitably secured transverse stop bar 139 extends across the left end portion of the depressed horizontal surface 138.

Adjacent the spool 129 the linear structure 105 is provided with a transverse stop bar 140 in the form of a rod which extends between the side wall portions 112 of the channel member 110 and is suitably secured thereto. This second stop 140 limits the extreme rightward travel of the pawl member 131 as viewed in FIG. 13, and corresponds to a fully protracted condition of the strap 106.

As best illustrated in FIGS. 14 and 15, the pawl member 131 is shown as comprising a body of inverted U-shape in transverse cross-section having an intermediate horizontal flat top wall portion 141 from the opposite longitudinal marginal edges of which depend integral vertical flanges 142. These downturned flanges 142 act as runners and each has an intermediate bottom edge portion 143 parallel to the upper surface of the top wall 141, an upwardly and rearwardly inclined rear bottom edge portion 144 and an upwardly and forwardly inclined front bottom edge portion 145.

The central front portion of the top wall 141 of the pawl member 131 is shown as having a straight transverse abutment face or edge 146 which projects forwardly with respect to the rearwardly inclined lateral edge portions 148. The runners 142 are shown as extending forwardly of the rear ends of the inclined front edges 148 of the top wall 141. Such forwardly projecting portion of each runner 142 is shown as having an upwardly and rearwardly inclined top edge 149 which is generally parallel to the rear bottom edge 144 of the corresponding runner. The high rear end of the top edges 149 extend above the upper surface of the top wall 141.

The runners 142 adjacent their inclined rear bottom edges 144 are shown as carrying a transverse bar 150 which is suitably secured at its opposite ends in these runners, such as by being arranged in holes provided therein of similar configuration to the cross-sectional shape of the bar 150 and staked or otherwise secured to prevent displacement from such holes. The inner end of the strap 106 is shown as formed with a loop indicated at 151 and surrounding the transverse bar 150. This loop 151 may be formed in any suitable manner on the strap 106.

The pawl member 131 and the strap 106, by reason of the attachment of the latter to the former, are constantly urged to a fully retracted position. While any suitable means may be provided for accomplishing this, the means illustrated comprises an elastic shock cord 152. One end of this cord 152 is shown as looped and surrounding an anchor pin 157 which depends from and is suitably centrally connected to the top wall 141 of the pawl member 131 between the salient abutment end face 146 and the transverse strap securing bar 150. This elastic cord 152 is shown as passing around a grooved guide wheel or pulley 153 suitably journalled on a bracket 154 which is suitably mounted on the housing end wall 121 as by screws one of which is indicated at 155. The upper portion of this guide wheel 153 extends through an opening provided in the inner cover 114 so that an end portion of the elastic cord 152 can be housed within the upper compartment 120. The extremity of this housed portion of the elastic cord 152 is anchored to the structure frame in any suitable manner as by the clip device 156 shown in FIG. 13. This clip device 156 is suitably secured to the extremity of the elastic cord as by clamp fingers and is hooked over the transverse base edge of the last tooth 133 adjacent the opening 128.

Inasmuch as the pawl member 131 pivots on the fulcrum corners 147 formed by juncture of the corresponding bottom edge portions 143 and 144, thereby assuming different angular positions with respect to the elastic cord 152, the top wall 141 of the pawl member adjacent it rear end is shown as being centrally cut out, indicated at 158, to prevent interference with this cord. In this connection the portion of the elastic cord 152 adjacent the anchor pin 157 passes over and bears downwardly against the strap securing bar 150. Therefore, the effect of the constant retractive force exerted upon the pawl member 131 by the elastic cord 152 is such as to produce a force component directed downwardly against the pawl member in rear of its fulcrums 147 and thereby produce a couple constantly urging the pawl member to pivot in a counterclockwise direction about these fulcrums, as viewed in FIGS. 16–21. Such pivotal bias of the pawl member 131 constantly urges its salient abutment face 146 into a path of interference with the opposing abutment faces 134 on the several ratchet teeth 133.

Deactivator means are shown as arranged to hold the pawl member 131 out of effective locking engagement with the ratchet teeth 133 at certain times. While such deactivator means may be variously constructed, the same is shown as comprising a pair of deactivator fingers 160. These fingers 160 are laterally spaced from each other and arranged between the upstanding front portions of the side runners 142 of the pawl member 131. The deactivator fingers 160 are similar in construction to each other. Each is formed to provide a flat edge surface 161 joined by a rounded corner edge surface 162 to a second flat edge surface 163 disposed at an angle to the first flat surface 161. Both fingers 160 are fast to a horizontal transverse shaft 164 which is suitably journalled at its ends in bearing holes 165 provided in the runners 142.

The finger assembly comprising the two fingers 160 and shaft 164 are biased to pivot in a counterclockwise direction relative to the pawl member 131 about the horizontal transverse longitudinal axis of the shaft 164, as viewed in FIGS. 16–21, by suitable spring means. While such spring means may be variously constructed, the same are shown as including a wind-up spring 166 having a series of convolutions spirally wrapped around the transverse shaft 164 and at opposite ends is formed to provide radial arms 167 and 168 each having an outturned finger at its free end. The finger of arm 167 is received in a hole 169 provided in the adjacent deactivator finger 160. The finger of arm 168 is received in a hole 159 provided in the runner 142 adjacent the other deactivator finger 160. The bias of such spring 166 urging relative movement between the fingers 160 and pawl member 131 is relatively slight as compared to the previously described fulcruming bias upon the pawl member exerted by the elastic cord 152.

The operation of the linear form of the invention shown in FIGS. 12–21 can best be understood by a specific consideration of FIGS. 17–21 which depict a sequence of operation. In FIG. 17, the pawl member 131 is in its starting position, also illustrated in FIGS. 13 and 16, in which the rear or left end of the pawl member abuts against the left stop 139. In this position the spacing between the opposing surfaces 137 and 138 is about equal to the height of the pawl member as measured between the runner bottom edges 143 and the upper surface of the top wall 141 so that the pawl member is held by the surface 138 downwardly against the channel floor 137, but the pawl member can be readily pulled longitudinally out of such narrow spacing. Also, in this position of the pawl member the deactivator fingers 160 will have pivoted so as to bring their flat edges 161 into engagement with the lower horizontal surfaces 117 of the inturned channel flanges 113, such pivotal movement being urged by the spring 166. This condition of the parts is illustrated in FIG. 17.

Assume now that the strap 106 is protracted. This will pull the pawl member 131 out of the vertically narrow space between the opposing surfaces 137 and 138, as depicted in FIG. 18. The sliding frictional contact between the deactivator finger edges 161 and the frame surfaces 117 tends to rotate the fingers 160 in a counterclockwise direction relative to the pawl member 131 about the axis of transverse shaft 164. These fingers 160 act as struts and serve to maintain the intermediate bottom edge portions 143 of the pawl runners 142 in sliding contact with the floor surface 137 whereby the pawl's salient abutment end face 146 is held below and out of engagement with the ratchet teeth 133. Accordingly, the strap 106 is free to be protracted to any extent desired.

Assume now that after some protraction of the strap 106, as would be occasioned by the user first pulling out the strap 106 to fasten the buckle elements 107 and 108, there is some retraction permitted as when the user releases the joined straps 106 and 106a to allow the slack in the belt so provided to be taken up. An early stage of such retraction is depicted in FIG. 19. As there shown, the deactivator finger 160 has begun to be pivoted in a clockwise direction relative to the pawl member 131 about the axis of transverse shaft 164. This has been effected by reason of the frictional contact between the opposing frictional surfaces 161 and 117 which ultimately separate, allowing the fingers 160 to roll on their rounded corners 162. Thus the strut action of the finger begins to collapse allowing the pawl member 131 to tip upwardly on its fulcrums 147. This upward tipping of the front portion of the pawl member 131 is urged by the elastic cord 152.

As retraction continues, the pawl member 131 ultimately assumes the position shown in FIG. 20. There the finger 160 has been shown as pivoted in a clockwise direction relative to the pawl member 131 about the axis of transverse shaft 164 so as to permit pawl top edges 149 to contact frame surfaces 117 and also to permit pawl heel edges 144 to engage the frame floor surface 137. In this position of the pawl member 131, it will be observed that the pawl abutment face 146 opposes an abutment face 134 on one of the ratchet teeth 133. Thus if further protraction is attempted, these abutment faces 134 and 146 will abuttingly engage each other and prevent such further protraction.

On the other hand, the pawl member 131 is free to slide in the opposite direction. This is permitted by the upper surface of the pawl top wall 141 slidingly engaging and camming on the inclined cam faces 135 of the ratchet teeth 133. Thus a ratcheting action takes place during retraction of the strap 106 and associated pawl member 131 but this member and the ratchet teeth operatively engage each other to prevent reverse relative movement between the pawl member and the teeth as would occur during attempted protraction of the strap.

Assume now that the wearer wants to free himself from the safety belt. He therefore manually disconnects the buckle elements 107 and 108 releasing the straps 106 and 106a so as to allow the same to be fully retracted. What takes place then is depicted in FIG. 21 wherein the pawl member 131 is shown as camming or ratcheting on one of the teeth 133 toward its starting position. Ultimately the top surface of the pawl member will engage the ramp surface 136 leading to the depressed horizontal surface 138 which will hold the pawl member down against the floor surface 137. During such retraction and ratcheting action, the deactivator fingers 160 ride along the under surfaces 117 of the housing frame, pivoting about the axis of transverse shaft 164 but never being allowed to assume a position in which the finger edges 161 re-engage the frame surfaces 117 until the pawl member approaches the fully retracted condition for the strap 106. As such fully retracted position is approached, the operative position of the deactivator fingers 160 will be restored as depicted in FIG. 17 so that the strap 106 may be protracted again during another cycle of operation.

It will be noted that in the linear type of structure shown in FIGS. 12–21, the strap 106 is prevented from a second protraction following a partial retraction from any extent of first protraction. Thus the mechanism is rendered operative at any place along the longitudinal extent of the linear structure.

FIGS. 22–26

The inventive restraint apparatus as illustrated in FIGS. 22–26 is embodied in another form of a linear type structure. The structure is represented generally by the numeral 180. The frame of the structure is generally similar to that of the form shown in FIGS. 12–21 and therefore comprises a channel member indicated generally at 181, having a base portion 182 the upper flat surface of which is indicated at 183, with transversely spaced upright integral flange or side wall portions 184. Each of these side walls 184 has at its upper end an inturned horizontal marginal flange 185. An inner cover 187 rests on the flanges 185 and has a depressed longitudinal central section 188 formed to provide a series of longitudinally spaced ratchet teeth 189. An outer cover 190 is arranged above the inner cover 187. The flanges 185 and covers 187 and 190 are joined together in any suitable manner.

One end of the channel member 181 is closed by an end wall 191. An end wall 192 closes the other end of the channel member. Adjacent the end wall 192 the frame of the linear structure is provided with an opening 193 in which is arranged a spool or guide roller 194 mounted for rotation about a horizontal transverse axle 195 suitably mounted on the structure frame. A strap 196 is shown as passing around the spool 194 and at its inner end is connected to a pawl member represented generally by the numeral 198.

The pawl member 198 and strap 196 are constantly urged toward a retracted condition by an elastic shock cord 199 which passes around a grooved guide wheel or pulley 200 mounted for rotation about a horizontal transverse pivot pin 201. This pin 201 is shown as journalled on the side walls of an open box-like bracket indicated generally at 202 which is suitably attached to the end wall 191 as by screws one of which is indicated at 203. The elastic cord 199 has an upper reach arranged in the space between the covers 187 and 190 and the end of this cord remote from the pawl member 198 is suitably connected to the frame structure.

The pawl member 198 is identical in construction to the pawl member 131 shown in FIGS. 12–21 and hence a detailed description thereof will not be repeated. The strap 196 is similar to the strap 106 shown in FIGS. 12–21. When in a starting position illustrated in FIG. 22, the pawl member 198 abuts against the end wall portion 204 of the bracket 202. When at the opposite extent of its travel the pawl member 198 engages a transverse stop bar 205, as illustrated in FIG. 24.

The pawl member 198 carries a pair of transversely spaced deactivator fingers 205 which functionally are the equivalent of the deactivator fingers 160 shown in FIGS. 12–21 but structurally different therefrom. Each of the deactivator fingers 205 is shown as having a pair of edge surfaces 206 and 207 arranged at about right angles to each other. The end of the surface 206 remote from the end which has a juncture with the surface 207 is shown as rounded as indicated at 208. The fingers 205 are fast to a transverse shaft or pivot pin 210 which has its ends shown journalled in bearing holes provided in the pawl member 198. A wind-up spring 211 has its spiral convolutions surrounding the transverse shaft 210 and the offset arm portions of this spring at opposite ends thereof are received in holes one of which indicated at 209 is provided in one of the deactivator fingers 205 and the other of which holes is provided in the pawl member 198 adjacent the other of these deactivator fingers. The spring 211 is operative constantly to urge the deactivator fingers 205 to the upright position shown in FIGS. 22 and 24 in which this spring is unloaded. In other words, when the fingers 205 are in the position shown in FIG. 23, they are urged by the spring 211 to pivot in a clockwise direction relative to the pawl member 198 about the axis of transverse shaft 210; but when these fingers are in the position shown in FIG. 25, they are urged by the spring to pivot in a counterclockwise direction. This pivotal urging is relatively minor as compared to the counterclockwise pivotal urging of the pawl member 198 induced by the elastic cord 199.

When the pawl 198 is in the starting position depicted in FIG. 22 it is in a tipped condition in which its front is raised off the channel floor surface 183, this tipped up condition being limited by the engagement of the top of the pawl member with a depressed horizontal surface 212 of the frame structure adjacent the bracket 202. Also, when in this starting position the deactivator fingers 205 extend upwardly severally into vertical slots 213 provided through the superposed parts 185, 187 and 190.

When the pawl member 198 is in its extreme terminal position representing full protraction of the strap 196, as depicted in FIG. 24, the deactivator fingers 205 severally project upwardly into vertical slots 214 provided in the superposed parts 185, 187 and 190 adjacent the stop bar 205.

Assuming the parts to be in the condition illustrated in FIG. 22 which depicts the fully retracted condition of the strap 196, as this strap is protracted it pulls the pawl member 198 in a rightward direction. This ultimately brings the rounded corners 208 on the deactivator fingers 205 into contact with the opposing end walls of the slots 213. Such engagement forces the fingers 205 to pivot in a counterclockwise direction relative to the pawl member 198 about the axis of transverse shaft 210 so as to cam the finger surfaces 206 into contact with the corresponding flat under surfaces 215 of the inturned channel flanges 185. This contact between the surfaces 206 and 215 forces the front end of the pawl member 198 downwardly so that the pawl member pivots clockwise about its fulcrum 218, whereby the abutment end face 216 of the pawl member is held out of engagement with any of the abutment end faces 217 of the ratchet teeth 189, as depicted in FIG. 23. In this manner the strap 196 is permitted to be protracted.

Assume now that the strap 196 has been so protracted to the full extent permitted, as depicted in FIG. 24. When the pawl member 198 is in the position there shown, it will swing from the previous position shown in FIG. 23 in a counterclockwise direction about the fulcrum 218. At the same time the deactivator fingers 205 pivot in a clockwise direction relative to the pawl member 198 about the axis of transverse shaft 210 to the position shown in FIG. 24 in which these fingers project upwardly into the slots 214.

If the strap 196 is now manually released so as to permit the elastic cord 199 to retract the pawl member 198 it will be seen that the surfaces 207 on the deactivator fingers 205 will engage the corresponding end walls of the slots 214 and cause further clockwise pivotal movement of these fingers. As the pawl member is being retracted the finger surfaces 207 will be cammed into sliding engagement with the frame surfaces 215, as depicted in FIG. 25. This allows the pawl member 198 to slide over the teeth 189 during retraction but yet be able to prevent reverse relative movement between the pawl member and the frame as would be occasioned if the strap 196 were attempted to be protracted a second time. As the pawl member 198 slides over the teeth 189 the fingers 205 will pivot relative to the pawl member to maintain the surfaces 207 and 215 in contact with each other.

It will further be seen that as the pawl member 198 approaches a fully retracted condition, the deactivator fingers 205 will be brought opposite the slots 213, permitting these fingers to project upwardly into these slots and thereby be returned to a position in which they are ready to be operative during a subsequent protraction of the strap 196.

Thus the slots 214 cooperating with the fingers 205 are effective to render these fingers inoperative or to deactivate the same, whereas the slots 213 are effective to reactivate the fingers or restore them to a preparatory operative position.

With the form of the invention shown in FIGS. 22–26 it will be noted that the strap 196 must be fully protracted before some retraction occurs in order to render the one-way stop means operative to prevent subsequent protraction of the strap, unless the strap is first fully retracted. This is in contrast to the form of the invention shown in FIGS. 12–21 in which the one-way stop means can be rendered operative after partial retraction following any amount of initial protraction.

From the foregoing it will be seen that the various embodiments illustrated and described accomplish the stated objects of the invention. Inasmuch as further modifications and changes in these illustrated embodiments may occur to those skilled in the art without departing from the spirit of the present invention, these embodiments are intended to be illustrative and not limitative of the invention the scope of which is to be measured by the appended claims.

What is claimed is:

1. In restraint apparatus, the combination comprising a toothed ratchet member having alternately disposed abutment and cam faces, a fulcrumed pawl member having an abutment face adapted to engage abuttingly one of said ratchet abutment faces to prevent relative movement between said members only in one direction, said pawl member also having a cam face adapted to slide on said ratchet cam faces to permit relative movement between said members in an opposite direction, a protractile and retractile restraining element constrained to move with one of said members which are arranged so that when engaging each other the aforesaid abutting engagement between said pawl and ratchet abutment faces is effective to prevent protraction of said element but the aforesaid sliding engagement between said pawl and ratchet cam faces is effective to permit retraction of said element, means constantly urging said element toward retraction, cam means engaging said pawl member automatically to fulcrum the same out of engagement with said ratchet member as said element approaches substantially full retraction, and means separate from said cam means to hold said members out of engagement during protraction of said element following each such substantially full retraction.

2. In restraint apparatus, the combination comprising a protractile and retractile restraining element, an elongated housing therefor having a plurality of ratchet teeth spaced longitudinally of said housing, a pawl member slidable longitudinally within said housing and engageable and disengageable with said teeth and constrained to move with said element, said pawl member when engaging said teeth being operative to prevent protraction of said element and to permit retraction of said element, means constantly urging said element toward retraction, and deactivator means arranged to hold said pawl member out of engagement with said teeth during protraction of said element following each substantially full retraction thereof.

3. In restraining apparatus, the combination comprising an elongated housing having a plurality of ratchet teeth spaced longitudinally thereof, a pawl member slidable longitudinally within said housing and engageable and disengageable with said teeth, a protractile and retractile restraining element connected to said pawl member, said pawl member when engaging said teeth being operative to prevent protraction of said element and to permit retraction of said element; means constantly biasing said element toward full retraction, and a deactivator finger member pivotally mounted on said pawl member and bearing against said housing so as to assume an operative position in which said finger member acts as a strut effective to hold said pawl member out of engagement with said teeth during starting protraction of said element but being caused by subsequent partial retraction of said element to pivot to an inoperative position in which said pawl member is released for engagement with said teeth.

4. In restraining apparatus, the combination comprising an elongated housing having a plurality of ratchet teeth spaced longitudinally thereof, a pawl member slidable longitudinally within said housing and engageable and disengageable with said teeth, a protractile and retractile restraining element connected to said pawl member, said pawl member when engaging said teeth being operative to prevent protraction of said element and to permit retraction of said element, means constantly biasing said element toward full retraction, a deactivator finger member pivotally mounted on said pawl member and bearing against said housing so as to assume an operative position in which said finger member acts as a strut effective to hold said pawl member out of engagement with said teeth during starting protraction of said element but being caused by subsequent partial retraction of said element to pivot to an inoperative position in which said pawl member is released for engagement with said teeth, and reactivator means for pivoting said finger member from its said inoperative position to its said operative position as said element approaches full retraction.

5. In restraining apparatus, the combination comprising an elongated housing having a plurality of ratchet teeth spaced longitudinally thereof, a pawl member slidable longitudinally within said housing and engageable and disengagable with said teeth, a protractile and retractile restraining element connected to said pawl member, said pawl member when engaging said teeth being operative to prevent protraction of said element and to permit retraction of said element, means constantly biasing said element toward full retraction, a deactivator finger member pivotally mounted on said pawl member and bearing against said housing so as to assume an operative position in which said finger member acts as a strut effective to hold said pawl member out of engagement with said teeth during starting protraction of said element but being caused by subsequent partial retraction of said element occurring at any extent of said starting protraction of said element to pivot to an inoperative position in which said pawl member is released for engagement with said teeth, and reactivator means for effecting pivotal movement of said finger member from its said inoperative position to its said operative position as said element approaches full retraction.

6. In restraining apparatus, the combination comprising an elongated housing having a plurality of ratchet teeth spaced longitudinally thereof, a pawl member slidable longitudinally within said housing and engageable and disengageable with said teeth, a protractile and retractile restraining element connected to said pawl member, said pawl member when engaging said teeth being operative to prevent protraction of said element and to permit retraction of said element, means constantly biasing said element toward full retraction, a deactivator finger member pivotally mounted on said pawl member and bearing against said housing so as to assume an operative position in which said finger member acts as a strut effective to hold said pawl member out of engagement with said teeth during starting protraction of said element, means for effecting pivotal movement of said finger member from its said operative position to an inoperative position in which said pawl member is released for engagement with said teeth as said element approaches full protraction, and reactivator means for effecting pivotal movement of said finger member from its said inoperative position to its said operative position as said element approaches full retraction.

7. In restraint apparatus, the combination comprising a restraining element in a predetermined retracted condition from which it is adapted to be protracted, means constantly urging said element toward retraction, deactivatable stop means for preventing protraction of said element but inoperative when said element is in said condition, and deactivator means for said stop means operative when said element is in said condition to render said stop means inoperative and including a member requiring no manipulation to permit protraction of said element from said condition but movable in response to partial retraction of said element following said protraction to render said stop means operative.

8. In restraint apparatus, the combination comprising a restraining element in a predetermined retracted condition from which it is adapted to be protracted, means constantly urging said element toward retraction, deactivatable stop means for preventing protraction of said element but inoperative when said element is in said condition and including a movable lock member, and deactivator means for said stop means mounted on said lock member and movable in response to retraction of said element following protraction to render said stop means operative.

9. In restraint apparatus, the combination comprising a restraining element in a predetermined retracted condition from which it is adapted to be protracted, means constantly urging said element toward retraction, deactivatable stop means for preventing protraction of said element but allowing retraction of said element at all times, deactivator means operative to render said stop means inoperative when said element is protracted from said condition and rendered inoperative by subsequent partial retraction of said element, and means arranged to reactivate said deactivator means as said element retracts to said condition.

References Cited by the Examiner
UNITED STATES PATENTS

| | | | |
|---|---|---|---|
| 2,581,235 | 1/1952 | Broberg | 74—17.5 X |
| 2,892,351 | 6/1959 | McCarty | 74—17.5 |
| 2,979,282 | 4/1961 | Barecki | 297—388 |
| 3,100,669 | 8/1963 | Monroe | 297—388 |

MILTON BUCHLER, *Primary Examiner.*

G. E. A. HALVOSA, *Assistant Examiner.*